US008219797B2

(12) United States Patent
Chinnaswamy et al.

(10) Patent No.: US 8,219,797 B2
(45) Date of Patent: Jul. 10, 2012

(54) METHOD AND SYSTEM TO FACILITATE CONFIGURATION OF A HARDWARE DEVICE IN A PLATFORM

(75) Inventors: Kumar Chinnaswamy, Hillsboro, OR (US); Ittai Anati, Haifa (IL); Alberto Martinez, El Dorado Hills, CA (US); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 12/347,879

(22) Filed: Dec. 31, 2008

(65) Prior Publication Data

US 2010/0169635 A1 Jul. 1, 2010

(51) Int. Cl.
*G06F 9/00* (2006.01)
*G06F 9/44* (2006.01)
*G06F 15/177* (2006.01)

(52) U.S. Cl. ............ 713/100; 713/1; 717/168; 717/171; 717/172; 717/173; 717/174; 717/176; 717/177; 717/178

(58) Field of Classification Search ............... 713/1, 100; 717/168, 171, 172, 173, 174, 176, 177, 178
See application file for complete search history.

(56) References Cited

U.S. PATENT DOCUMENTS

| 5,524,245 | A | * | 6/1996 | Zarrin et al. | 713/2 |
| 5,864,698 | A | * | 1/1999 | Krau et al. | 713/2 |
| 6,081,890 | A | * | 6/2000 | Datta | 713/1 |
| 6,138,236 | A | * | 10/2000 | Mirov et al. | 726/26 |
| 6,305,005 | B1 | * | 10/2001 | Burnham | 716/117 |
| 6,625,729 | B1 | * | 9/2003 | Angelo et al. | 713/2 |
| 6,904,527 | B1 | * | 6/2005 | Parlour et al. | 713/189 |
| 7,716,501 | B2 | * | 5/2010 | Edwards et al. | 713/300 |
| 2003/0120970 | A1 | * | 6/2003 | Chen | 714/25 |
| 2004/0221147 | A1 | * | 11/2004 | Tseng et al. | 713/1 |
| 2005/0144609 | A1 | * | 6/2005 | Rothman et al. | 717/168 |
| 2007/0150715 | A1 | * | 6/2007 | Rothman et al. | 713/1 |
| 2009/0279699 | A1 | * | 11/2009 | Noda | 380/259 |

OTHER PUBLICATIONS

W1zzard, X800 GTO and GTO2 to X850 XT Mod, Sep. 13, 2005, http://www.techpowerup.com/articles/overclocking/127.*
W1zzard, Guide to Video BIOS flashing, May 24, 2004, http://www.techpowerup.com/articles/overclocking/vidcard/34/8.*

* cited by examiner

*Primary Examiner* — Mark Connolly
(74) *Attorney, Agent, or Firm* — Blakely, Sokoloff, Taylor & Zafman LLP

(57) ABSTRACT

A method and system to allow the secure configuration of the configurable feature(s) of a hardware device in a platform. The configuration of the configurable feature(s) of the hardware device is performed with protection against software attacks. A management module determines that the platform is authorized to configure at least one configurable feature of the hardware device and configures each of the configurable feature(s) based on a received configuration message.

29 Claims, 5 Drawing Sheets

METHOD AND SYSTEM TO FACILITATE CONFIGURATION OF A HARDWARE DEVICE IN A PLATFORM

FIELD OF THE INVENTION

This invention relates to a platform, and more specifically but not exclusively, to facilitate configuration of a configurable feature of a hardware device in the platform.

BACKGROUND DESCRIPTION

Computer platforms often have a pre-defined configuration for its hardware devices that is fixed at the point of deployment. A hardware device may have certain feature such as clock speed, bus width, or other characteristic that differentiates itself from another version of the hardware device. The configuration of the hardware devices in the computer platform typically cannot be changed without replacing the existing hardware module.

For example, a computer platform may have a Intel® Core™ Duo processor with a clock speed of 1.73 gigahertz (Ghz). If an user desires to upgrade the clock speed of the current processor from 1.73 Ghz to 2.33 Ghz or to add the feature of Intel® Virtualization Technology (Intel®VT), the user would have to replace the current processor of the platform by an Intel® Core™ Duo processor with clock speed of 2.33 Ghz and with Intel® VT feature enabled.

There are no avenues currently that allow a secure configuration of the configurable features in a hardware device in a platform. Protection against software attacks on the configuration of the configurable features in the hardware device is important to ensure that no rogue upgrade is performed.

BRIEF DESCRIPTION OF THE DRAWINGS

The features and advantages of embodiments of the invention will become apparent from the following detailed description of the subject matter in which.

DETAILED DESCRIPTION

Reference in the specification to "one embodiment" or "an embodiment" of the invention means that a particular feature, structure or characteristic described in connection with the embodiment is included in at least one embodiment of the invention. Thus, the appearances of the phrase "in one embodiment" appearing in various places throughout the specification are not necessarily all referring to the same embodiment.

Embodiments of the inventions provide a method and system to allow the secure configuration of the configurable feature(s) of a hardware device in a platform. The configuration of the configurable feature(s) of the hardware device is performed with protection against software attacks. The software attack includes, but is not limited to, attack using software hooks, attack of the basic input/output system (BIOS), or any other software attempt to obtain configuration of the configurable feature(s) without valid credentials.

Figure 1:
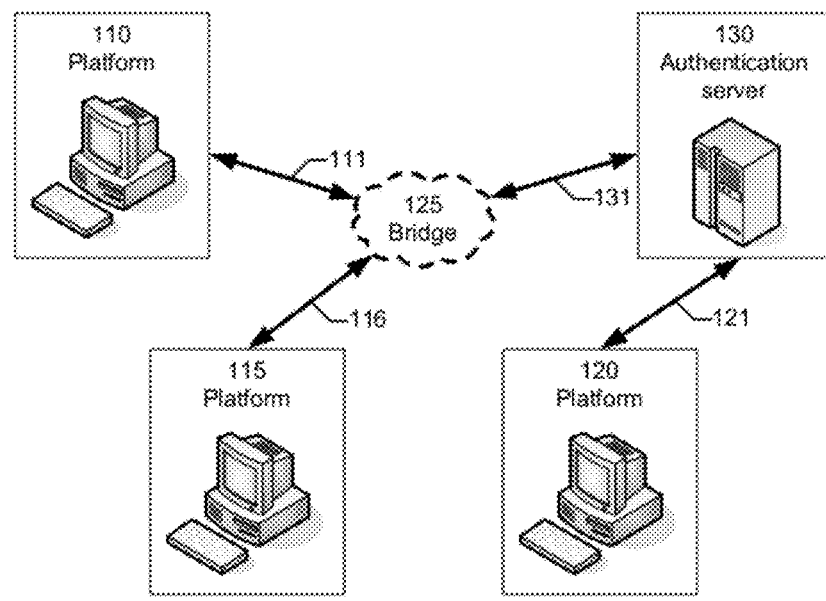
FIG. 1 illustrates a network where several platforms communicate with an authentication server in accordance with one embodiment of the invention.

FIG. 1 illustrates a network 100 where platforms 110, 115 and 120 communicate with an authentication server 130 in accordance with one embodiment of the invention. The platforms 110, 115 and 120 each have a hardware device(s) with configurable feature(s). The platform includes, but is not limited to, a desktop computer, a laptop computer, a notebook computer, a personal digital assistant (PDA), a server, a workstation, a cellular telephone, a mobile computing device, an Internet appliance or any other type of computing device. The hardware device includes, but is not limited to, a central processing unit (CPU), a chipset, or any other hardware device that can be designed with a configurable feature(s). The configurable feature of a hardware device includes, but is not limited to, the maximum operating clock frequency, the bus operating speed, the cache size, the cache speed, the power consumption, the security feature, the encryption scheme, or any other characteristic or function of the hardware device.

In FIG. 1, the platforms 110, and 115 are connected with authentication server 130 via a bridge 125. The bridge 125 includes, but is not limited to, an access point, a router, the Internet, a switch or any device capable of enabling communication between the platforms 110, and 115 and the authentication server 130. In other embodiments, the bridge 125 is optional. For example, the platform 120 can be connected directly with the authentication server 130 without the bridge 125. Communication links 111, 116, 121, 131 include, but are not limited to, Ultra Wide Band (UWB), Wireless fidelity (WiFi), Home Plug Audio Video (HPAV), Bluetooth, Ethernet, optical fiber and any wired or wireless means of communication between the authentication server 130 and the platforms 110, 115, and 120.

Although only three platforms 110, 115, and 120 are depicted as connected with the authentication server 130, it is not meant to be limiting and more than three platforms can be connected with the authentication server 130. In addition, the three platforms 110, 115, and 120 can be connected with more than one authentication server and can also be connected with different authentication servers. In other embodiments, the authentication server 130 may be a part of the platforms 110, 115, and 120.

Figure 2:
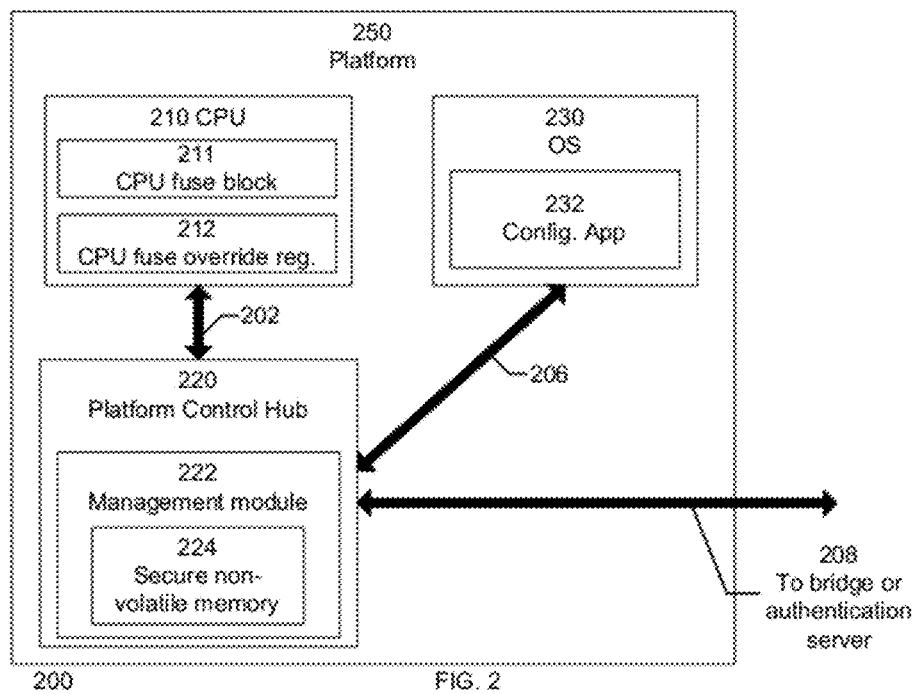
FIG. 2 illustrates a platform configuration according to one embodiment of the invention.

FIG. 2 illustrates a platform configuration 200 according to one embodiment of the invention. The platform 250 has three modules, namely, the CPU 210, the operating system (OS) 230, and the platform control hub (PCH) 220. The CPU 210 has a CPU fuse block 211 and a CPU fuse override register 212. The CPU fuse block 211 has hardware fuses that determine the configuration of the configurable feature(s) of the CPU 210. In one embodiment, the CPU fuse block 211 is preset with a default value that determines the configuration of the configurable feature(s) of the CPU 210. For example, when CPU 210 is manufactured, it may have the capability to support clock speeds of 1.73 GHz or 2.33 GHz. The configuration of the clock speed can be preset in the CPU fuse block 211 to support 1.73 GHz.

The CPU fuse override register 212 enables firmware or micro code executing in the CPU 210 to override the setting of the CPU fuse block 211. When the CPU 210 overrides the settings of the CPU fuse block 211 with the contents of the CPU fuse override register 212, the configurable feature(s) is enabled or disabled based on the settings of the CPU fuse override register 212. In one embodiment, the CPU fuse override register 212 can only be written once. In another embodiment, the CPU fuse override register 212 is locked after it is written and cannot be changed by the operating system 230 until the CPU 210 gets a new request to update the CPU fuse override register 212. The CPU fuse override register 212 is not reset by a reset of the platform 250 and its contents are not erased by the reset. The CPU fuse override register 212 is not accessible by the OS 230 to avoid any possible software attack.

In one embodiment, a logical exclusive OR (XOR) operation is performed on the contents in the CPU fuse override register 212 with the contents of the CPU fuse block 211. The result of the XOR operation is routed to the functional block of the configurable feature(s) of the CPU 210 to enable or disable the feature.

The CPU 210 is connected with the PCH 220. The PCH 220 has a management module (MM) 222 that communicates with the authentication server 130 via communication link 208. In one embodiment, the MM 222 receives a permit to authorize the configuration of the configurable feature(s) of the CPU 210 from the authentication server 130. The permit is a binary data file that contains information about the CPU 210 and the configuration settings of each configurable feature(s) of the CPU 210. The permit is digitally signed to ensure that the permit has not been modified. The MM 222 stores the permit in a secure non-volatile memory 224 that is not accessible by the OS 230 or any other firmware of the platform. The secure non-volatile memory 224 is tamper-proof to prevent any software attacks on the permit and it includes, but is not limited to, secure flash memory, read only memory (ROM), or any other type of secure memory that retains its data when powered off. The communication link 202 between the CPU 210 and PCH 220 is a hardwire connection and is also not accessible by the OS 230.

The third module of the platform 250 is the OS 230. A configuration application 232 executes in the OS 230 to initiate the MM 222 to communicate with the authentication server 130 to obtain the permit. The configuration application 232 communicates with the MM 222 via communication link 206. Although only one set of CPU fuse block 211 and one set of CPU fuse override register 212 are illustrated, multiple CPU fuse blocks 211 and/or CPU fuse override registers 212 can also be used.

Figure 3:
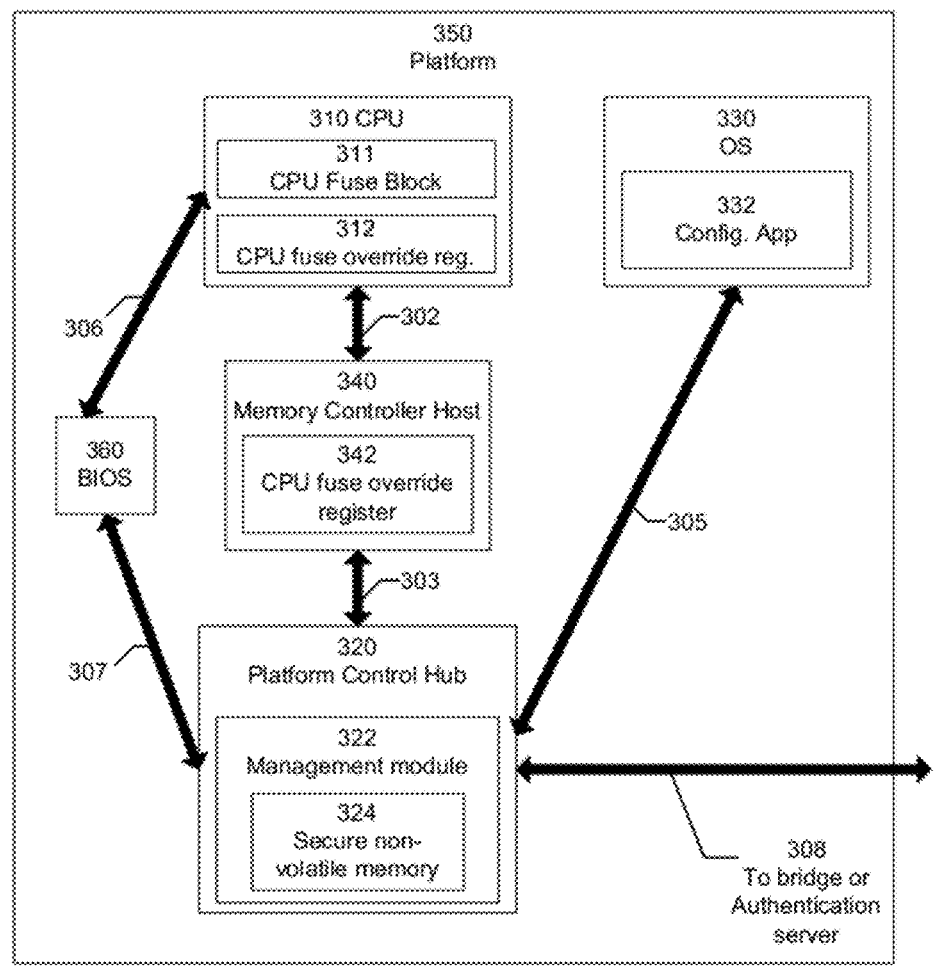
FIG. 3 illustrates a platform configuration according to one embodiment of the invention.

FIG. 3 illustrates a platform configuration 300 according to one embodiment of the invention. The platform 350 has five modules, namely, the CPU 310, the memory controller host (MCH) 340, the PCH 320, the BIOS module 360, and the OS 330. The CPU 310 and the OS 330 have the same configuration as the CPU 210 and OS 230 of FIG. 2 and the operation and functionality of the CPU 310 and the OS 330 shall not be repeated herein. The PCH 320 is connected with the BIOS module 360 via communication link 307. In one embodiment, the BIOS module 360 is implemented using Intel® Active Management Technology (AMT) management BIOS extensions (MEBx).

The MM 324 sends a request to the BIOS module 360 to obtain the configuration information of the CPU 310. The BIOS module 360 communicates with the CPU 310 to obtain the configuration information of CPU 310 via communication link 306. The BIOS module 360 then sends the configuration information of CPU 310 to the MM 322. The configuration information of the CPU 310 includes, but is not limited to, identification information, a serial number(s), a model number, configurability information on each configurable feature(s), or any other information associated with CPU 310. The MCH 340 interfaces the CPU 310 and the PCH 320 via communication links 302 and 303. The MCH has a CPU fuse override register 342 that contains the configuration settings of the configurable feature(s) of the CPU 310.

Although the CPUs 210 and 310 are illustrated in the platforms 250 and 350 as the hardware devices with configurable feature(s), it is not meant to be limiting and other hardware devices such as a chipset can be configured in a similar manner according to the methods disclosed herein. There can be multiple CPUs and/or multiple chipsets that can be configured in platforms 250 and 350 that are not illustrated.

Figure 4:
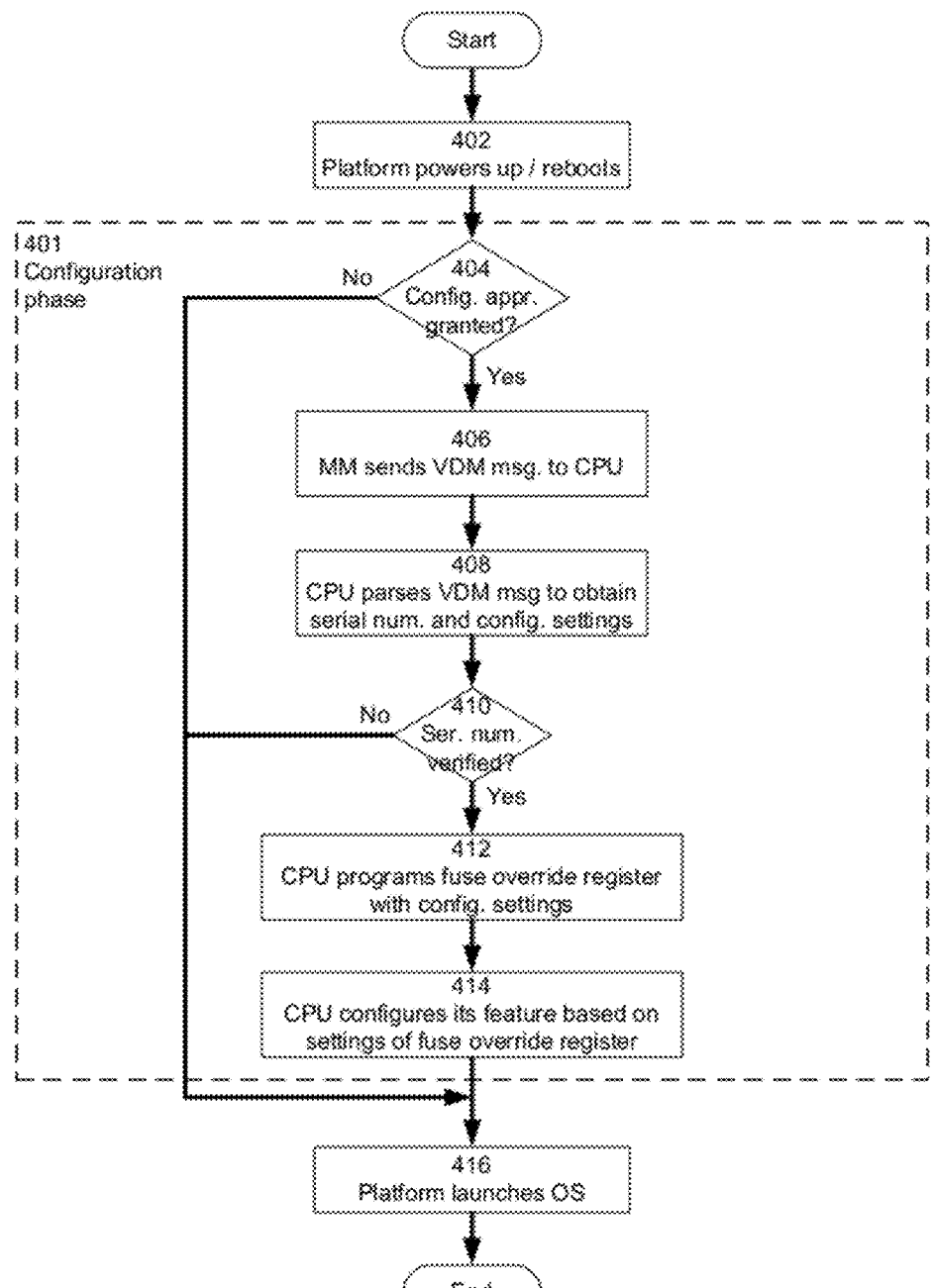
FIG. 4 illustrates a flowchart of the configuration phase of a platform in accordance with one embodiment of the invention.

FIG. 4 illustrates a flowchart 400 of the configuration phase 401 of the platform 250 in accordance with one embodiment of the invention. The configuration phase 401 is performed every time the platform 250 is powered up or rebooted. When the platform 250 loses power, the configurable feature(s) of the CPU needs to be configured again.

In step 402, the platform 250 powers up or reboots. The flow enters the configuration phase 401 of the platform 250. In step 404, the MM 222 checks if approval is granted to authorize the platform 250 to configure the configurable feature(s) of the CPU 210. In one embodiment, the MM 222 determines that the platform is authorized by checking if a permit to authorize the configuration of the configurable feature(s) of the CPU 210 is present in its secure non-volatile memory 324.

In another embodiment, MM 222 checks the expiry date and time of the permit, and determines that the platform 250 is authorized to configure the configurable feature(s) when the current date and time of the platform 250 is prior to the expiry date and time of the permit. This allows a trial period to be set for a particular feature of the CPU 210 to be enabled for the user of the platform 250. After the trial period, the particular feature of the CPU 210 is deactivated and the particular feature will revert to its default settings.

For example, the CPU 210 may have a default clock speed of 1.80 Ghz and the user of the platform 250 obtains a trial period of 30 days to try out a higher clock speed of the CPU 210 at 2.5 Ghz. A permit with 30 days expiry date from the start of the trial date is stored in the secured non-volatile memory 224 of the MM 222. When the platform 250 powers up or reboots, it enters the configuration phase 401 and the CPU 210 is configured to run at 2.5 Ghz. On the 31st day after the start of the trial, the MM 222 determines that the permit has expired and does not send a configuration message to the CPU 210. The CPU 210 then reverts to its default clock setting of 1.8 Ghz.

If approval is not given in step 404, the configuration phase 401 ends and the flow goes to step 416 to launch the OS 230. If approval is given in step 404, the MM 222 sends a vendor defined message (VDM) to the CPU 210. The VDM includes information such as, but is not limited to, CPU identification (CPUID) of CPU 210, a serial number(s) of CPU 210, a model number of CPU 210, or any other information associated with CPU 210. The CPUID, in one embodiment, enumerates the configurability information on each configurable feature of the CPU 210.

In step 408, the CPU 210 parses the VDM to obtain the configuration settings of each configurable feature(s) and the serial number of CPU 210. The CPU 210 verifies if the serial number obtained from the VDM matches its serial number in step 410. If no, the configuration phase 401 ends and the flow goes to step 416 to launch the OS. If yes, in step 412, the CPU 210 programs the CPU fuse override register 212 with the configuration settings obtained from step 408. In step 414, the CPU 210 configures its configurable feature(s) based on the settings of the CPU fuse override register 212. In one embodiment, the CPU 210 performs the configuration by overriding the contents of CPU fuse block 211 with the contents of the CPU fuse override register 212. After the configuration by the CPU 210, the platform 250 launches the OS 230.

With the ability to perform after sales configurability of the hardware device(s) of platform 250, inventory management of the hardware stock keeping unit (SKU) can be improved or eased. For example, if a hardware device such as CPU 210 is available in clock speeds of 1.80 GHz, 2 Ghz, 2.2 GHz. 2.4 Ghz, and 2.50 Ghz, separate inventory management for each version of the hardware device is required. Predicting the right quantity of each hardware SKU to build and managing the inventory of the various SKUs is a big challenge that can be eased with embodiments of the invention. By way of an example, one version of the CPU 210 can be designed to support all the various clock speeds and the default clock setting of the CPU 210 is set at the lowest clock speed of 1.8 Ghz. A user of the platform 250 can then purchase an upgrade permit to configure the CPU 210 to run at a higher clock speed. In this way, only one inventory management is required for the CPU 210 that supports all the various clock speeds.

Figure 5:
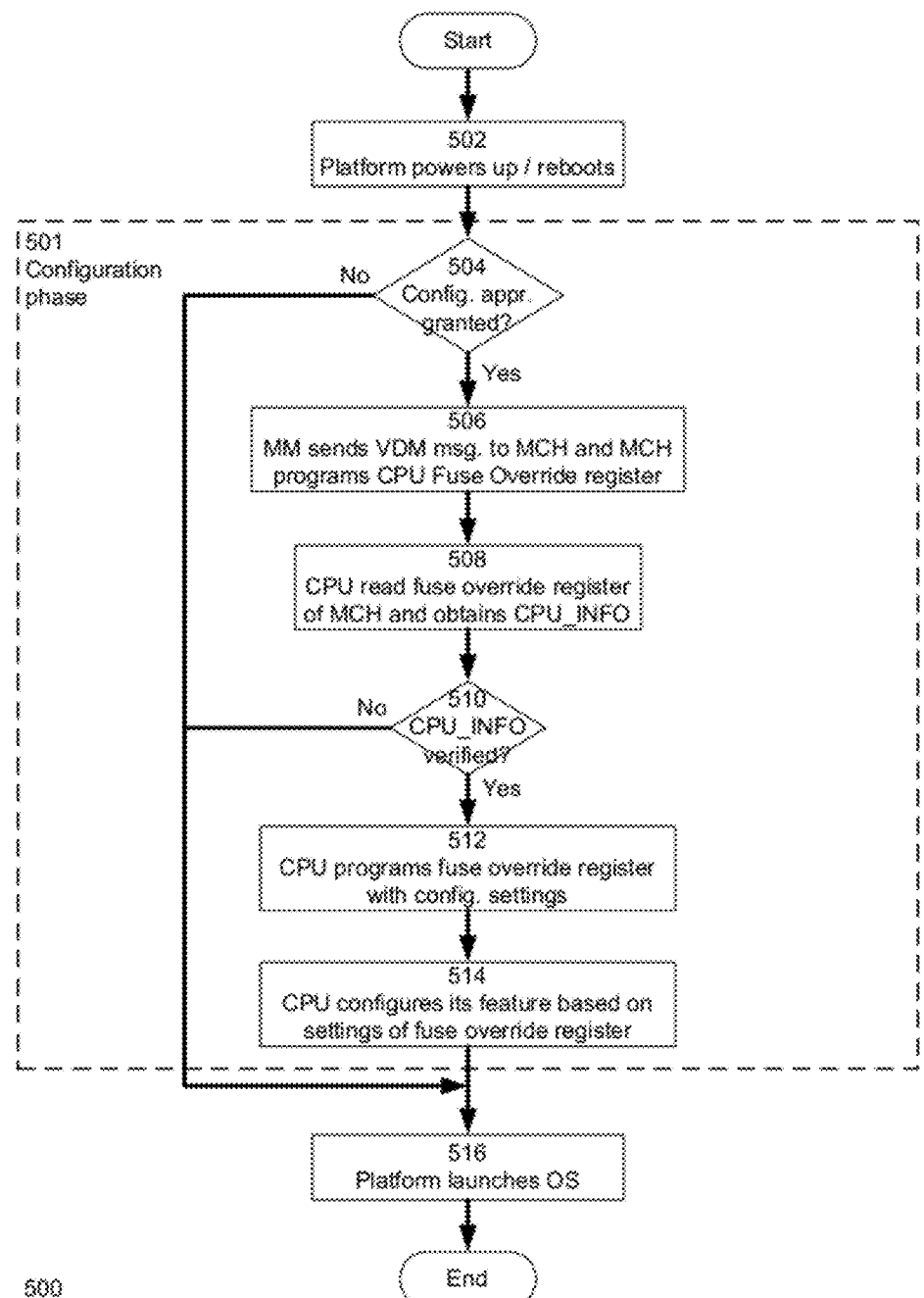
FIG. 5 illustrates a flowchart of the configuration phase of a platform in accordance with one embodiment of the invention.

FIG. 5 illustrates a flowchart 500 of the configuration phase 501 of a platform 350 in accordance with one embodiment of the invention. In step 502, the platform 350 powers up or reboots. The flow enters the configuration phase 501 of the platform 350. In step 504, the MM 322 checks if approval is granted to authorize the platform 350 to configure the configurable feature(s) of the CPU 310. In one embodiment, the MM 322 determines that the platform 350 is authorized by checking if a permit to authorize the configuration of the configurable feature(s) of the CPU 310 is present in its secure non-volatile memory 324.

If no, the configuration phase 501 ends and the flow goes to step 516 to launch the OS 330. If yes, the MM 322 sends a VDM to the MCH 340 in step 506. The MCH 340 parses the VDM to obtain the configuration settings of each configurable feature of the CPU 310 and the CPU information (CPU_INFO) of CPU 310 and programs the CPU fuse override register 342 with the configuration settings and the CPU_INFO. In one embodiment, the CPU fuse override register 342 of the MCH 340 has only read access availability to the CPU 310. In step 508, the CPU 310 reads the CPU fuse override register 342 of the MCH 340 and obtains the CPU_INFO. In step 510, the CPU 310 verifies if the CPU_INFO obtained from the CPU fuse override register 342 of the MCH 340 matches its CPU_INFO. If no, the configuration phase 501 ends and the flow goes to step 516 to launch the OS. If yes, in step 512, the CPU 310 programs its CPU fuse override register 312 with the contents of the CPU fuse override register 342 of the MCH 340 obtained from step 508.

The verification performed by the CPU 310 in step 510 avoids a possible software attack in one embodiment of the invention. For example, a possible software attack may intercept the communication between the BIOS module 360 and the MM 322 and presents false configuration information of the CPU 310. The false configuration information presented to the MM 322 is used to obtain a permit from the authentication server 130. Based on the false configuration information, the authentication server 130 grants approval of the request to configure the configurable feature(s) of the CPU 310. When CPU 310 verifies the configuration message in step 510, it detects that the CPU_INFO obtained from the CPU fuse override register 342 of the MCH 340 does not match its CPU_INFO. The CPU 310 may perform a recovery action such as, but is not limited to, sending a reset request to the platform 350, sending a notification to the MM 322 or aborting the update of its configurable feature(s).

In step 514, the CPU 310 configures its configurable feature(s) based on the settings of the CPU fuse override register 312. In one embodiment, the CPU 310 performs the configuration by overriding the contents of CPU fuse block 311 with the contents of the CPU fuse override register 312. By overriding the fuse configuration of the CPU fuse block 311, by way of an example, a particular feature of the CPU 310 previously disabled by fuses can now be enabled if that particular feature was turned off during manufacturing time.

In some embodiments of the invention, the cost of entry to bring new SKUs to market when the demand for those features within the SKUs has not been established yet may be reduced. This is because of lesser inventory management with fewer hardware SKUs to maintain.

Figure 6:
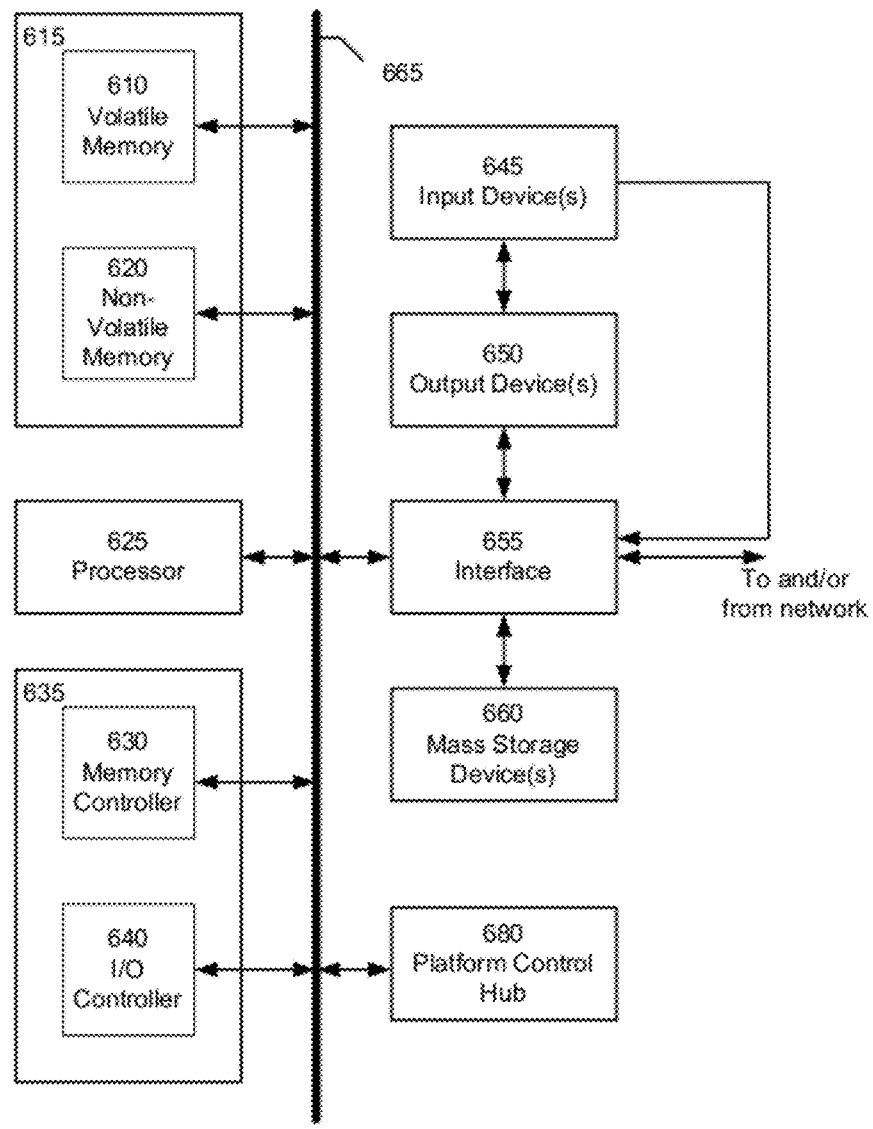
FIG. 6 illustrates a system that facilitates the configuration of the configurable feature(s) of its hardware device in accordance with one embodiment of the invention.

FIG. 6 illustrates a block diagram of a system 600 to implement the methods disclosed herein according to an embodiment. The system 600 includes but is not limited to, a desktop computer, a laptop computer, a notebook computer, a personal digital assistant (PDA), a server, a workstation, a cellular telephone, a mobile computing device, an Internet appliance or any other type of computing device. In another embodiment, the system 600 used to implement the methods disclosed herein may be a system on a chip (SOC) system.

The system 600 includes a chipset 635 with a memory controller 630 and an input/output (I/O) controller 640. A chipset typically provides memory and I/O management functions, as well as a plurality of general purpose and/or special purpose registers, timers, etc. that are accessible or used by a processor 625. The processor 625 may be implemented using one or more processors. In one embodiment, the PCH 680 is connected to the processor 625 via bus 665.

The memory controller 630 performs functions that enable the processor 625 to access and communicate with a main memory 615 that includes a volatile memory 610 and a non-volatile memory 620 via a bus 665. In one embodiment of the invention, the BIOS module 360 is stored in the non-volatile memory 620. In another embodiment of the invention, the memory controller 630 is the MCH 340 described in FIG. 3.

The volatile memory 610 includes but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 620 includes but is not limited by, flash memory, Read Only Memory (ROM), Electrically Erasable Programmable Read Only Memory (EEPROM), and/or any other desired type of memory device.

Memory 615 stores information and instructions to be executed by the processor 625. Memory 615 may also stores temporary variables or other intermediate information while the processor 625 is executing instructions. The system 600 includes but is not limited to, an interface circuit 655 that is coupled with bus 665. The interface circuit 655 is implemented using any type of well known interface standard including, but is not limited to, an Ethernet interface, a universal serial bus (USB), a third generation input/output interface (3GIO) interface, and/or any other suitable type of interface.

One or more input devices 645 are connected to the interface circuit 655. The input device(s) 645 permit a user to enter data and commands into the processor 625. For example, the input device(s) 645 is implemented using but is not limited to, a keyboard, a mouse, a touch-sensitive display, a track pad, a track ball, and/or a voice recognition system.

One or more output devices 650 connect to the interface circuit 655. For example, the output device(s) 650 are implemented using but are not limited to, light emitting displays (LEDs), liquid crystal displays (LCDs), cathode ray tube (CRT) displays, printers and/or speakers). The interface circuit 655 includes a graphics driver card. The system 600 also includes one or more mass storage devices 660 to store software and data. Examples of such mass storage device(s) 660 include but are not limited to, floppy disks and drives, hard disk drives, fast flash disk drives, solid state hard drives, compact disks and drives, and digital versatile disks (DVD) and drives.

The interface circuit 655 includes a communication device such as a modem or a network interface card to facilitate exchange of data with external computers via a network. The communication link between the system 600 and the network may be any type of network connection such as an Ethernet connection, a digital subscriber line (DSL), a telephone line, a cellular telephone system, a coaxial cable, etc.

Access to the input device(s) 645, the output device(s) 650, the mass storage device(s) 660 and/or the network is typically controlled by the I/O controller 640 in a conventional manner. In particular, the I/O controller 640 performs functions that enable the processor 625 to communicate with the input device(s) 645, the output device(s) 650, the mass storage device(s) 660 and/or the network via the bus 665 and the interface circuit 655.

While the components shown in FIG. 6 are depicted as separate blocks within the system 600, the functions performed by some of these blocks may be integrated within a single semiconductor circuit or may be implemented using two or more separate integrated circuits. For example, although the memory controller 630 and the I/O controller 640 are depicted as separate blocks within the chipset 635, one of ordinary skill in the relevant art will readily appreciate that the memory controller 630 and the I/O controller 640 may be integrated within a single semiconductor circuit.

Although examples of the embodiments of the disclosed subject matter are described, one of ordinary skill in the relevant art will readily appreciate that many other methods of implementing the disclosed subject matter may alternatively be used. For example, the order of execution of the blocks in the flow diagrams may be changed, and/or some of the blocks in block/flow diagrams described may be changed, eliminated, or combined. In another example, the operations of one element may also be performed by one or more other elements.

In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method to facilitate configuration of a hardware device in a platform comprising:
    determining that the platform is authorized to configure at least one configurable feature of the hardware device;
    configuring each of the at least one configurable feature based at least in part on a received configuration message;
    receiving configuration information of the hardware device, wherein the configuration information comprises configurability information on each of the at least one configurable feature, and an identification information of the hardware device;
    receiving a permit to authorize the configuration from an authentication authority; and
    storing the permit in a secure non-volatile memory, wherein the secure non-volatile memory is not accessible by an operating system of the platform.

2. The method of claim 1, wherein the received configuration message comprises identification information of the hardware device, and further comprising:
    verifying that the identification information of the hardware device in the received configuration message matches an identity of the hardware device.

3. The method of claim 2, wherein configuring each of the at least one configurable feature comprises:
    parsing the received configuration message to obtain configuration settings of each of the at least one configurable feature of the hardware device; and
    programming at least one fuse register with the configuration settings in the hardware module, wherein the at least one fuse register determine the configuration of the at least one configurable feature.

4. The method of claim 1, wherein configuring each of the at least one configurable feature comprises enabling or disabling each of the at least one configurable feature of the hardware device based at least in part on the received configuration message.

5. The method of claim 1, wherein the hardware device is a central processing unit (CPU) or a chipset.

6. The method of claim 1, wherein determining that the platform is authorized to configure the at least one configurable feature comprises determining that the permit is present in the secure non-volatile memory.

7. The method of claim 1, wherein the permit comprises an expiry date and time, and wherein determining that the platform is authorized to configure the at least one configurable feature comprises determining that a current date and time of the platform is prior to the expiry date and time of the permit.

8. The method of claim 1 further comprising sending a configuration message based at least in part on the permit when the platform is powered up or when the platform is rebooted, wherein the configuration message comprises the configuration of each of the at least one configurable feature.

9. A system comprising:
a central processing unit (CPU) to receive a configuration message, wherein the CPU comprises at least one configurable feature; and
a management module, coupled with the CPU, to:
determine that the system is authorized to configure the at least one configurable feature of the CPU by checking if a permit to authorize the configuration of the at least one configurable feature of the CPU is present in a secure non-volatile memory, wherein the secure non-volatile memory is not accessible by the operating system of the platform; and
send the configuration message to the CPU, wherein the CPU is further to configure each of the at least one configurable feature based at least in part on the received configuration message.

10. The system of claim 9, wherein the CPU further comprises at least one fuse register, and wherein the CPU to configure each of the at least one configurable feature is to:
parse the received configuration message to obtain configuration settings of each of the at least one configurable feature of the CPU; and
program the at least one fuse register with the configuration settings in the CPU, wherein the at least one fuse register determine the configuration of the at least one configurable feature.

11. The system of claim 9, wherein the CPU to configure each of the at least one configurable feature comprises enabling or disabling each of the at least one configurable feature of the CPU based at least in part on the received configuration message.

12. The system of claim 9, wherein the management module is further to:
receive configuration information of the CPU, wherein the configuration information comprises configurability information on each of the at least one configurable feature, and an identification information of the CPU; and
receive a request to configure the at least one configurable feature based at least in part on the received configuration information.

13. The system of claim 12, wherein the management module further comprises a secure non-volatile memory, and wherein the management module is further to:
receive a, permit to authorize the configuration from an authentication authority; and
store the permit in the secure non-volatile memory, wherein the secure non-volatile memory is not accessible by an operating system of the system.

14. The system of claim 13, wherein the management module to determine that the system is authorized to configure the at least one configurable feature is to determine that the permit is present in the secure non-volatile memory.

15. The system of claim 13, wherein the permit comprises an expiry date and time, and wherein the management module to determine that the system is authorized to configure the at least one configurable feature is to determine that a current date and time of the system is prior to the expiry date and time of the permit.

16. The system of claim 13, wherein the management module is further to send the configuration message based at least in part on the permit when the platform is powered up or when the platform is rebooted, and wherein the configuration message comprises the configuration of each of the at least one configurable feature.

17. The system of claim 13, wherein the permit is associated with the identification information of the CPU to allow only the CPU to configure each of the at least one configurable feature.

18. The system of claim 12 further comprising a basic input/output system (BIOS) firmware coupled with the CPU and with the management module to:
obtain the configuration information of the CPU; and
send the configuration information of the CPU to the management module.

19. The system of claim 18 further comprising a memory controller host coupled with the management module and with the CPU, and wherein the management module to send the configuration message to the CPU is to send the configuration message to the CPU via the memory host controller.

20. The system of claim 9, wherein the coupling between the CPU and the management module is not accessible by an operation system of the system.

21. The system of claim 9, wherein the configuration message is defined in accordance with a vendor defined message (VDM).

22. The system of claim 9, wherein the received configuration message comprises identification information of the CPU, and wherein the CPU is further to:
verify that the identification information of the CPU in the received configuration message matches an identity of the CPU.

23. A central processing unit (CPU) with at least one configurable feature comprising:
a firmware module to:
receive a configuration message; and
configure each of the at least one configurable feature based at least in part on the received configuration message and to cause a management module, coupled with the CPU, to:
determine that the system is authorized to configure the at least one configurable feature of the CPU by checking if a permit to authorize the configuration of the at least one configurable feature of the CPU is present in a secure non-volatile memory, wherein the secure non-volatile memory is not accessible by the operating system of the platform; and
send the configuration message to the CPU, wherein the CPU is further to configure each of the at least one configurable feature based at least in part on the received configuration message.

24. The CPU of claim 23, wherein the CPU further comprises at least one fuse register, and wherein the firmware module to configure each of the at least one configurable feature is to:
parse the received configuration message to obtain configuration settings of each of the at least one configurable feature of the CPU; and
program the at least one fuse register with the configuration settings in the CPU, wherein the at least one fuse register determine the configuration of the at least one configurable feature.

25. The CPU of claim 23, wherein the firmware module to configure each of the at least one configurable feature comprises enabling or disabling each of the at least one configurable feature of the CPU based at least in part on the received configuration message.

26. The CPU of claim 23, wherein the firmware module is further to:
  obtain the configuration information of the CPU; and send the configuration information of the CPU to a basic input/output system (BIOS) firmware.

27. The CPU of claim 23, wherein receive the configuration message comprises accessing at least one register in a memory host controller.

28. The CPU of claim 23, wherein the configuration message is defined in accordance with a vendor defined message (VDM).

29. The CPU of claim 23, wherein the received configuration message comprises identification information of the CPU, and wherein the firmware module is further to:
  verify that the identification information of the CPU in the received configuration message matches an identity of the CPU.

* * * * *